US011134331B2

(12) United States Patent
Lovich et al.

(10) Patent No.: US 11,134,331 B2
(45) Date of Patent: Sep. 28, 2021

(54) MIXING MICROPHONES FOR WIRELESS HEADSETS

(71) Applicant: Google LLC, Mountain View, CA (US)

(72) Inventors: Vitali Lovich, San Francisco, CA (US); Jeffrey Kuramoto, Mountain View, CA (US)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 16/683,371

(22) Filed: Nov. 14, 2019

(65) Prior Publication Data

US 2020/0196043 A1 Jun. 18, 2020

Related U.S. Application Data

(60) Provisional application No. 62/779,192, filed on Dec. 13, 2018.

(51) Int. Cl.
*H04R 1/10* (2006.01)
*G10L 21/0232* (2013.01)
(Continued)

(52) U.S. Cl.
CPC ........ *H04R 1/1041* (2013.01); *G10L 21/0232* (2013.01); *H04R 1/1016* (2013.01);
(Continued)

(58) Field of Classification Search
CPC .... H04R 1/1041; H04R 1/1016; H04R 1/406; H04R 3/005; H04R 29/005; H04R 2420/07; G10L 21/0232; G10L 2021/02082
(Continued)

(56) References Cited

U.S. PATENT DOCUMENTS 9,924,010 B2 3/2018 Watson et al.
2003/0100274 A1 5/2003 Brown
(Continued)

FOREIGN PATENT DOCUMENTS

| CN | 108886647 A | 11/2018 |
| EP | 3276905 A1 | 1/2018 |
| WO | 2018017338 A1 | 1/2018 |

OTHER PUBLICATIONS

International Search Report and Written Opinion for International Application No. PCT/US2019/061417 dated Feb. 12, 2020. 15 pages.

*Primary Examiner* — Ammar T Hamid
(74) *Attorney, Agent, or Firm* — Lerner, David, Littenberg, Krumholz & Mentlik, LLP (57) ABSTRACT

An audio playback system may be adaptable to various situations for improved user experience and audio playback quality. For example, earbuds may be both worn by a same user, worn by two different users within audio range of one another, worn by two different users outside of audio range of one another, etc. A second earbud with a secondary microphone operates in a second mode in which it captures audio and encodes it for transmission to the first earbud having a primary microphone. The first earbud with the primary microphone operates in a first mode in which it mixes the audio received from the second earbud with audio received through its own microphone for playback. The first earbud in the first mode may also delay its own microphone stream to compensate for wireless transmission delay and correlate the two audio streams to improve audio quality in case there are sounds that can be picked up by both microphones.

20 Claims, 9 Drawing Sheets

(51) Int. Cl.
*H04R 1/40* (2006.01)
*H04R 3/00* (2006.01)
*H04R 29/00* (2006.01)
H04R 1/02 (2006.01)
G10L 21/0208 (2013.01)

(52) U.S. Cl.
CPC ............. *H04R 1/406* (2013.01); *H04R 3/005* (2013.01); *H04R 29/005* (2013.01); *G10L 2021/02082* (2013.01); *H04R 2420/07* (2013.01)

(58) Field of Classification Search
USPC ............................................ 381/66, 74, 334
See application file for complete search history.

(56) References Cited

U.S. PATENT DOCUMENTS

| | | |
|---|---|---|
| 2017/0094389 A1 | 3/2017 | Saulsbury et al. |
| 2017/0311105 A1 | 10/2017 | Hariharan et al. |
| 2018/0014102 A1 | 1/2018 | Hirsch et al. |
| 2018/0132026 A1* | 5/2018 | Liang .................... H04R 1/1025 |
| 2019/0044576 A1* | 2/2019 | Thoen ................... H04B 5/0031 |
| 2019/0268698 A1* | 8/2019 | Riha ...................... H04R 5/033 |

* cited by examiner

MIXING MICROPHONES FOR WIRELESS HEADSETS

CROSS-REFERENCE TO RELATED APPLICATIONS

The present application claims the benefit of the filing date of U.S. Provisional Patent Application No. 62/779,192 filed Dec. 13, 2018, the disclosure of which is hereby incorporated herein by reference.

BACKGROUND

Due to limitations in the short range wireless communication standards, wireless earbuds only support one of the buds serving as the "active" microphone which captures audio and transmits it to a host device during a phone call, whereas the other earbud has the "inactive" microphone. This presents a user experience problem for users as they are unable to easily share their bud with a friend while on a phone call even though there is a reasonable expectation that the "3-way" call would work seamlessly.

BRIEF SUMMARY

The present disclosure provides an audio playback system adaptable to various situations for improved user experience and audio playback quality. According to one example, the audio playback system includes two earbuds, and the various situations to which the earbuds adapt include differences in how the earbuds are worn. For example, the earbuds may be both worn by a same user, worn by two different users within audio range of one another, worn by two different users outside of audio range of one another, etc. A second earbud with a secondary microphone, which conventionally served as the "inactive" microphone in standards, operates in a second mode in which it captures audio and encodes it for transmission to the first earbud having a primary microphone, which conventionally served as the "active" microphone in standards. The first earbud with the primary microphone operates in a first mode in which it mixes the audio received from the second earbud with audio received through its own microphone for playback. The first earbud in the first mode may also delay its own microphone stream to compensate for wireless transmission delay and correlate the two audio streams to improve audio quality in case there are sounds that can be picked up by both microphones. In the situation where two remote users are wearing the earbuds, audio data captured by the first earbud may be transmitted over a sideband channel to the second earbud for mixing and playback as a local sidetone.

One aspect of the disclosure provides a system for playing back audio, the system including a first device. The first device includes a microphone configured to capture first audio information for transmission to a host computing device, and one or more first processors configured to receive second audio information from a second device over a sideband channel between the first device and the second device, and mix the second audio information from the second device with the first audio information from the first device. The system may further include the second device wirelessly coupled with the first device, wherein the second device includes a second microphone configured to operate in a secondary role wherein it captures the second audio information for transmission to the first device over the sideband channel.

According to some examples, the one or more first processors of the first device may be configured to determine whether the first device and the second device are worn by the same person, and perform echo cancellation when the first device and the second device are worn by the same person. The first device may further include a first speaker, wherein the one or more first processors of the first device are further configured to determine whether the first device is within audio range of the second device. In response to determining that the first device is not within audio range of the second device, in some examples, the first device plays the mixed microphone data as a sidetone through the first speaker. In response to determining that the first device is not within audio range of the second device, in other examples, the first device transmits the audio information captured by the first microphone to the second device over the sideband channel. The second device mixes the received first audio information from the first device with the second audio information captured by the second microphone and plays, through the second speaker, the mixed audio information as a sidetone.

The second device may further include one or more second processors configured to determine whether the first device is within audio range of the second device. The second device may be further configured to listen to audio transmitted over a wireless connection between the first device and the computing device when the first device is not within audio range of the second device, and play the audio data received by the listening as a local sidetone.

Another aspect of the disclosure provides a method for playing back audio. The method includes operating, by a first microphone of a first device, in primary role wherein the first microphone captures audio information for transmission from the first device to a host computing device, operating, by a second microphone of a second device, in a secondary role wherein the second microphone captures audio information for transmission from the second device to the first device over a sideband channel, and mixing, by one or more first processors of the first device, the audio information from the second device with the audio information from the first device.

Yet another aspect provides a method, including capturing, by a first microphone of a first device, first audio information for transmission from the first device to a host computing device, receiving, by the first device, second audio information from a second device over a sideband channel, and mixing, by one or more first processors of the first device, the audio information from the second device with the audio information from the first device.

DETAILED DESCRIPTION

Overview

A sideband channel between two audio playback devices, such as two earbuds, may be used to transmit microphone data from a second device with an "inactive" microphone to a first device with an "active" microphone. As used in this disclosure, "active" and "inactive" do not necessarily refer to whether the microphones capture audio, but rather refer to whether the microphones are in a primary device directly connected to a host or a secondary device. The first device mixes the microphone data as it comes in. This solution is seamless, in that the user's voice is captured regardless of whether the first device having the primary microphone is worn by the user, by another user, or not worn at all.

To minimize delay resulting from the second device encoding and transmitting data, the data may in some examples by encoded as L2CAP and mixed in on the first device as it is received. This should alleviate bandwidth and performance concerns of trying to maintain two active isochronous audio connections. Reducing the delay should also reduce echo in the first device. Echo may be further reduced by, for example, using echo cancellation to omit the secondary microphone data from the second device altogether if the system detects that the same user is wearing both the first and second devices. As another example, the echo cancellation may be used in combination with a determination of whether the user wearing both devices is speaking.

Determining whether one person is wearing both devices may be performed by, for example, comparing a power and signal of each device. For example, if the same user is wearing both devices, such as two earbuds, power and signal may be roughly the same with a temporal shift. In contrast, if a different user is wearing each of the two devices, a different power and signal as well as the temporal shift may be evident. In other examples, external signals, such as detection of whether the user is speaking, identification of voice parameters received in each microphone, etc., may be used to distinguish one wearer vs multiple wearers.

When two separate users are wearing the devices, and are separated from each other over a distance such that they are not within earshot of one another, the user wearing the second device with the inactive microphone would typically not hear what the other user is saying. To resolve this, in one example, the second device having the secondary microphone may spy on an audio connection between the first device and a wirelessly coupled computing device. For example, where the first device is a wireless earbud coupled to a mobile phone through a Bluetooth connection, the second device may listen in on audio transmitted from the first device to the phone over that connection. The second device may play the audio received from such spying as a local sidetone. The first device may play the mixed microphone data as a sidetone. In another example, the first device may send its microphone data to the second device for mixing and playback as a local sidetone. In yet another example, only the first device plays the mixed sidetone, potentially using on-head detect (OHD) transitions to determine whether the devices are being worn (e.g., on head or not), and to determine which device has the active microphone based on whether it is being worn.

Example Systems

Figure 1:
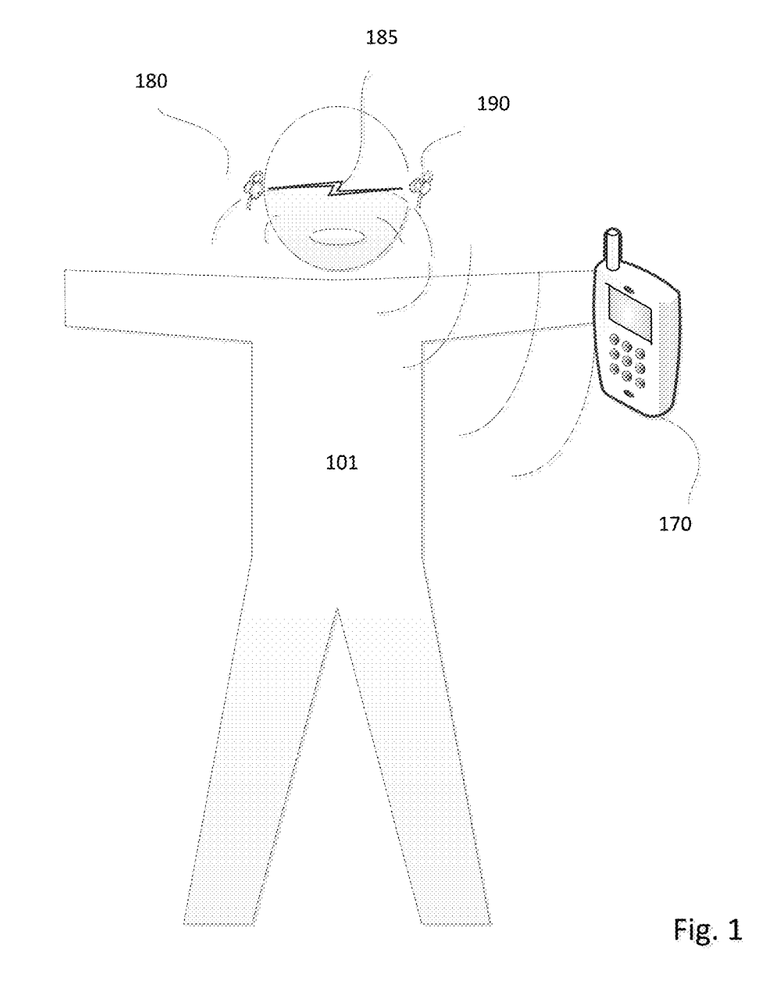
FIG. 1 is a pictorial diagram illustrating an example use of an auxiliary device according to aspects of the disclosure.

FIG. 1 illustrates an example of a user 101 wearing a first audio playback device 190 and a second audio playback device 180. In this example, the first and second devices 180, 190 are earbuds. In other examples, however, the first and second device may be other types of devices, of the same type or different types. For example, the first device may be an in-ear speaker/microphone while the second device is a smartwatch or a head-mounted display apparatus.

As shown in FIG. 1, the second device 180 is coupled to the first device 190 via a connection 185. The connection 185 may include a standard short-range wireless coupling, such as a Bluetooth connection. The connection 185 may further include a primary isochronous audio channel, such as for standard Bluetooth transmission, as well as a sideband channel, such as a separate isochronous audio channel.

Each of the second device 180 and the first device 190 have a microphone, with only one of the microphones operating in a primary mode at a given time. The primary microphone may capture the user's voice and transmit it to computing device 170, which may be, for example, a mobile phone or other mobile computing device.

The secondary microphone, for example on second device 180, may nevertheless capture the user's voice, and encode it for transmission to the first device 190 over the sideband channel of connection 185. Either or both of the devices 180, 190 may determine that the devices are worn by the same user 101. When the devices are worn by the same user, the first device 190, upon receipt of the encoded data from the second device 180, may perform echo cancellation. Such echo cancellation may include omitting the received encoded data, or any of a number of other techniques.

Figure 2:
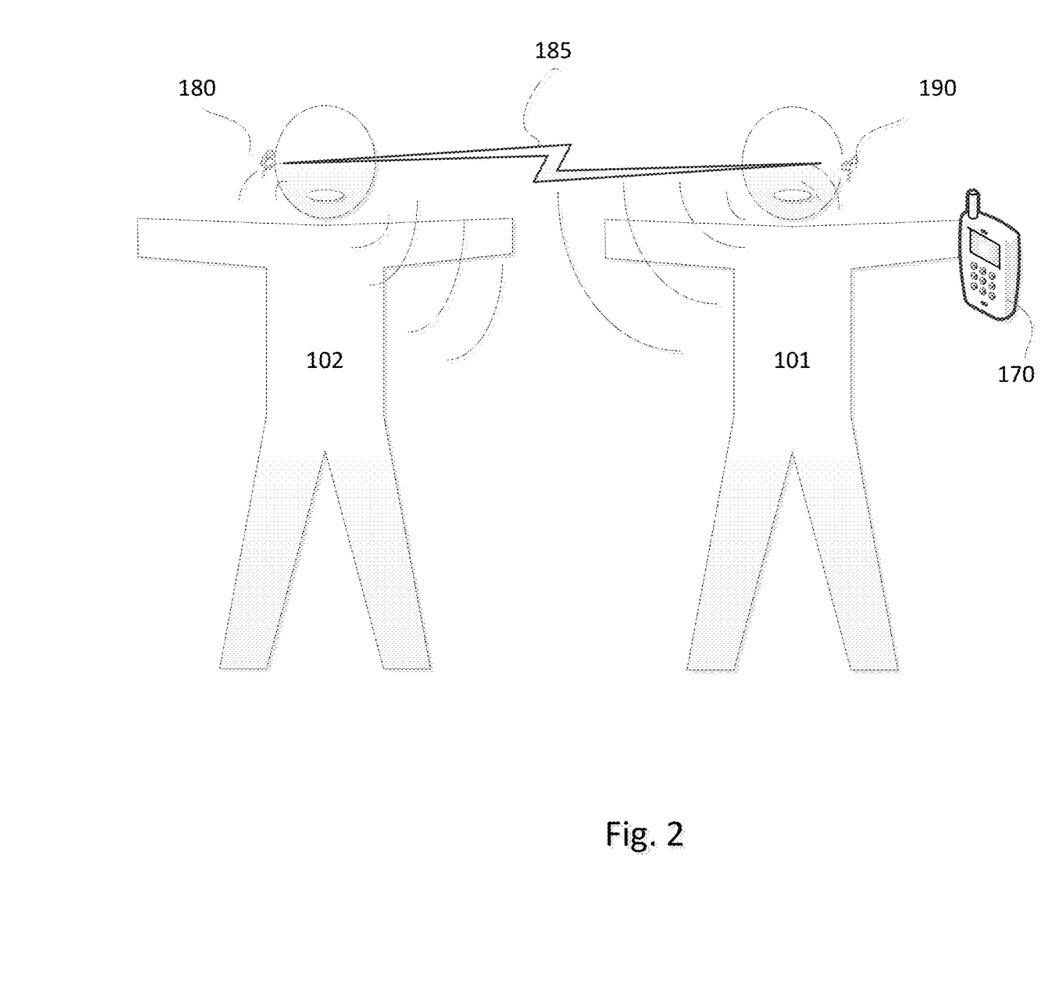
FIG. 2 is a pictorial diagram illustrating another example use of an auxiliary device according to aspects of the disclosure.

FIG. 2 illustrates another example where the first user 101 is wearing the first device 190 and a second user 102 is wearing the second device 180. As such, the first device 190 may capture the voice of the first user 101 and playback audio for the first user 101, which the second device 180 captures the voice of the second user 102 and plays back audio for the second user 102. The connection 185 still extends between the first device 190 and the second device 180.

Either or both of the devices 180, 190 may determine if they are within audio range of one another. For example, signals passed over the connection 185 between the devices 180, 190 may be used to determine a physical distance between the devices. In other examples, second user's voice may be faintly detected by the first device 190, and the first user's voice may similarly be faintly detected by the second device 180. Again in this example, one of the devices, such as the second device 180, may have a secondary microphone, while the other device, such as the first device 190, has a primary microphone. Because the users 101, 102 are within close range of one another, the first user 101 should be able to hear the voice of the second user, such as through the ear without an earbud, and the second user 102 should similarly hear the voice of the first user 101.

Keeping with the example where the second device 180 has the inactive microphone, the second device 180 captures the voice of the second user 102, encodes it, and transmits the encoded voice to the first device 190 over the sideband channel. The first device 190 receives the encoded voice of the second user 102, and mixes it with the voice of the first user captured through the primary microphone. This mixed audio data is then played back through the first device 190. In some examples, the devices 180, 190 may determine which user 101, 102 is speaking at a given time. For example, the devices 180, 190 may cross reference a volume level between their respective microphones. If the sound received through microphone of the second device 180 is quiet and the sound received through the microphone of the first device 190 is loud, then it may be determined that the user 101 is providing speech input, and vice versa. Determining which user is talking may be useful in a number of situations. For example, when mixing audio, volume may be reduced or muted on a stream for the user that is not actively talking. As another example, determining which use is talking may provide a way for a person (not shown) on the other end of the phone call to see who is talking, such as by seeing an image of the person that is talking on a screen of their phone or other device.

Figure 3:
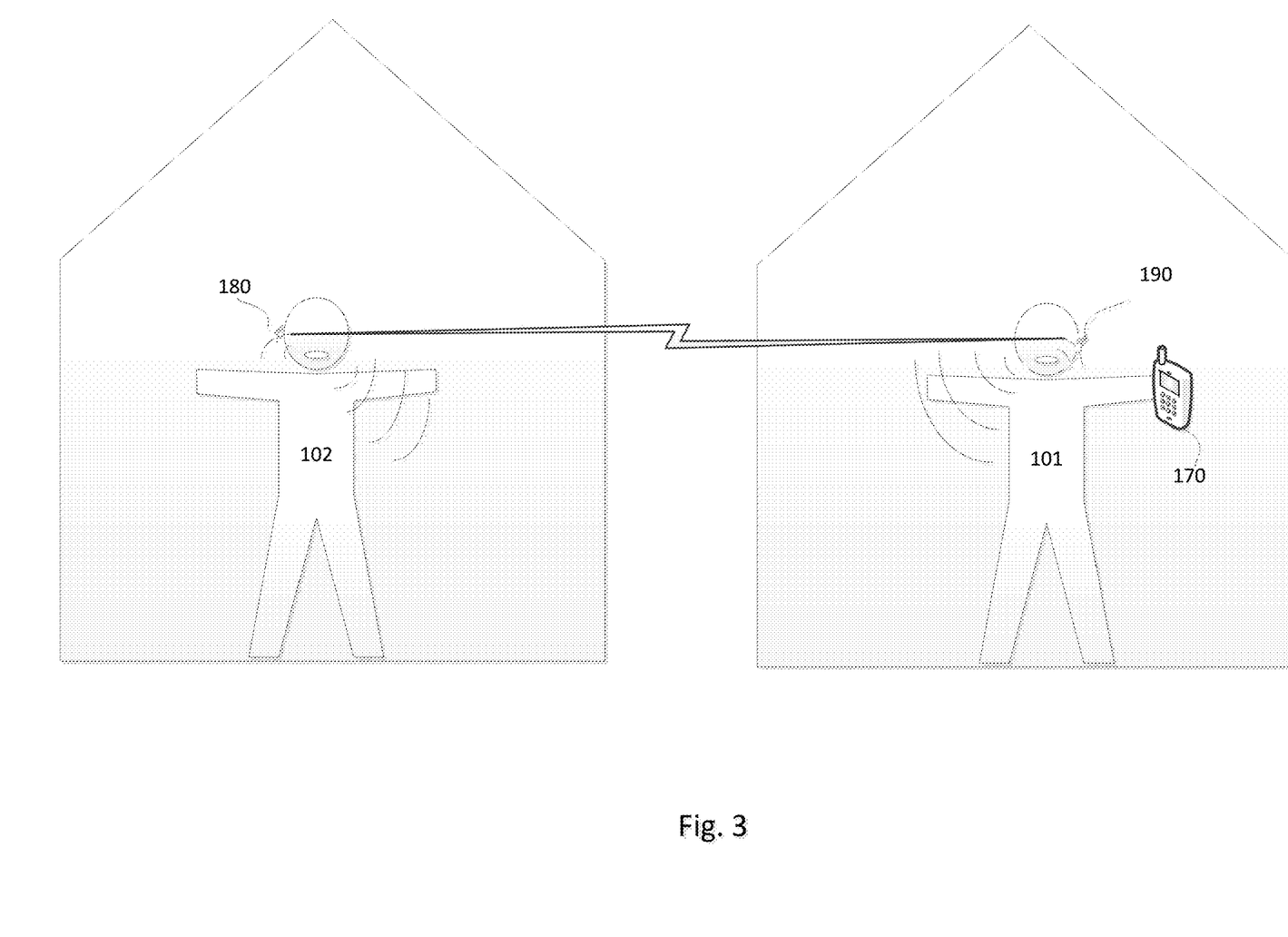
FIG. 3 is a pictorial diagram illustrating another example use of an auxiliary device according to aspects of the disclosure.

FIG. 3 illustrates yet another example, where the second user 102 wearing the second device 180 with the secondary microphone is out of audio range of the first user 101 wearing the first device 190 with the primary microphone. In this example, the first and second users 101, 102 will not be able to hear each other's voices without the voices being transmitted through the microphones of the respective devices 180, 190.

According to a first example, the second device 180 having the secondary microphone may spy on audio data transmitted from the first device 190 to the mobile device 170 to detect voice input of the first user 101. The second device 180 may play the detected voice input as a sidetone. The first device 190 may play the mixed microphone data, including the encoded voice input from the second device 180 mixed with the voice input captured by the first device 190, as a sidetone.

According to a second example, the first device 190 may transmit the captured voice of the first user 101 to the second device 180 for mixing by the second device 180. For example, the captured voice of the first user 101 may be encoded by the first device 190 and transmitted to the second device 180. The second device may mix the received voice of the first user 101 with the captured voice of the second user 102, and playback the mixed audio as a sidetone through the second device 180.

According to yet another example, the first device 190 plays the mixed microphone data as a sidetone.

According to an even further example, the first device 190 that is closer to the mobile device 170 may also transmit the audio stream from the mobile device 170 to the second device 180, which can mix the audio stream with audio from the microphone of the first device 190.

Figure 4:
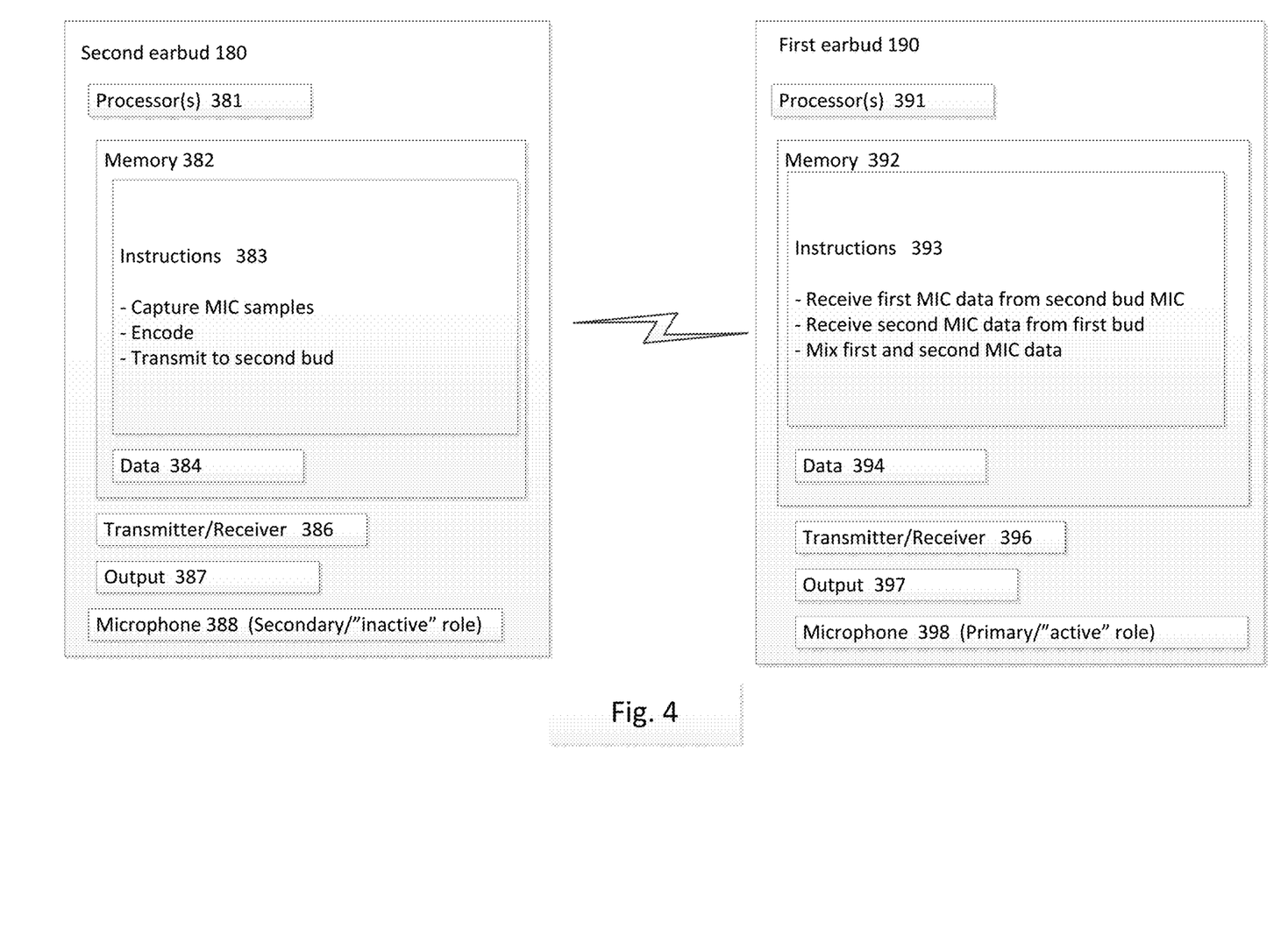
FIG. 4 is a functional block diagram illustrating an example system according to aspects of the disclosure.

FIG. 4 provides an example block diagram of the first auxiliary device 190 and the second auxiliary device 180. The auxiliary devices 180, 190 can be any of various types of devices, such as earbuds, head-mounted device, smartwatches, etc. Each device includes one or more processors 391, 381, memory 392, 382, and other components typically present in audio playback devices and auxiliary devices. While a number of components are shown, it should be understood that such components are merely non-limiting examples, and that other components may additionally or alternatively be included.

The one or more processors 391, 381 may be any conventional processors, such as commercially available microprocessors. Alternatively, the one or more processors may be a dedicated device such as an application specific integrated circuit (ASIC) or other hardware-based processor. Although FIG. 3 functionally illustrates the processor, memory, and other elements of auxiliary devices 180, 190 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the auxiliary devices 180, 190. Accordingly, references to a processor or computing device will be understood to include references to a collection of processors or computing devices or memories that may or may not operate in parallel.

Memory 382 may store information that is accessible by the processors 381, including instructions 383 that may be executed by the processors 381, and data 384. The memory 382 may be of a type of memory operative to store information accessible by the processors 381, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 383 and data 384 are stored on different types of media.

Data 384 may be retrieved, stored or modified by processors 381 in accordance with the instructions 383. For instance, although the present disclosure is not limited by a particular data structure, the data 384 may be stored in computer registers, in a relational database as a table having a plurality of different fields and records, XML documents, or flat files. The data 384 may also be formatted in a computer-readable format such as, but not limited to, binary values, ASCII or Unicode. By further way of example only, the data 384 may be stored as bitmaps comprised of pixels that are stored in compressed or uncompressed, or various image formats (e.g., JPEG), vector-based formats (e.g., SVG) or computer instructions for drawing graphics. Moreover, the data 384 may comprise information sufficient to identify the relevant information, such as numbers, descriptive text, proprietary codes, pointers, references to data stored in other memories (including other network locations) or information that is used by a function to calculate the relevant data.

The instructions 383 may be executed to improve audio playback and user experience. For example, the instructions 383 may provide for capturing audio samples through an secondary microphone, encoding the audio samples, and transmitting them to the second device 190.

While the first auxiliary device 180 is executing the instructions 383, the second auxiliary device 190 may also be executing instructions 393 stored in memory 392 along with data 394. For example, similar to the auxiliary device 180, the auxiliary device 190 may also include memory 392 storing data 394 and instructions 393 executable by the one or more processors 391. The memory 392 may be any of a variety of types, and the data 394 may be any of a variety of formats, similar to the memory 382 and data 384 of the auxiliary device 180. While the auxiliary device 180 is receiving and encoding speech from the user wearing the auxiliary device 180, the second auxiliary device 190 may be listening for and receiving speech as well through microphone 398. The instructions 393 may provide for receiving first microphone data from the microphone 398 of the second device, receiving second microphone data from the microphone 388 of the first device 180, and mixing the first and second microphone data. The mixed microphone data may be used for playback through the second device 190. According to some example, the first device may be configured to mix microphone data as well for playback. Moreover, the first device 180 and second device 190 may be configured to switch back and forth between roles, such as having a microphone in a primary role, or having a microphone in a secondary role. Accordingly, while the example of FIG. 4 illustrates a particular set of operations in each set of instructions, it should be understood that either device may be capable of executing either set of instructions, as well as additional or other instructions. By way of example only, the instructions 383, 393 may be executed to determine whether the first and second devices 180, 190 are worn by the same user, are worn by different users within audio range of one another, or worn by different users out of audio range of one another. For example, the devices 180, 190 may distinguish one wearer from multiple wearers using any of a variety of voice recognition techniques, measurement and/or comparison of power, signals, or other information, etc.

The mixed microphone data, or other audio data, may be played through outputs 387, 397. The outputs 387, 397 may each include, for example, one or more speakers adapted to provide audible output. In some examples, the outputs 387, 397 may also include one or more other types, such as displays, tactile feedback, etc.

It should be understood that the auxiliary device 180 and mobile device 190 may each include other components which are not shown, such charging input for the battery, signals processing components, etc. Such components may also be utilized in execution of the instructions 383, 393.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
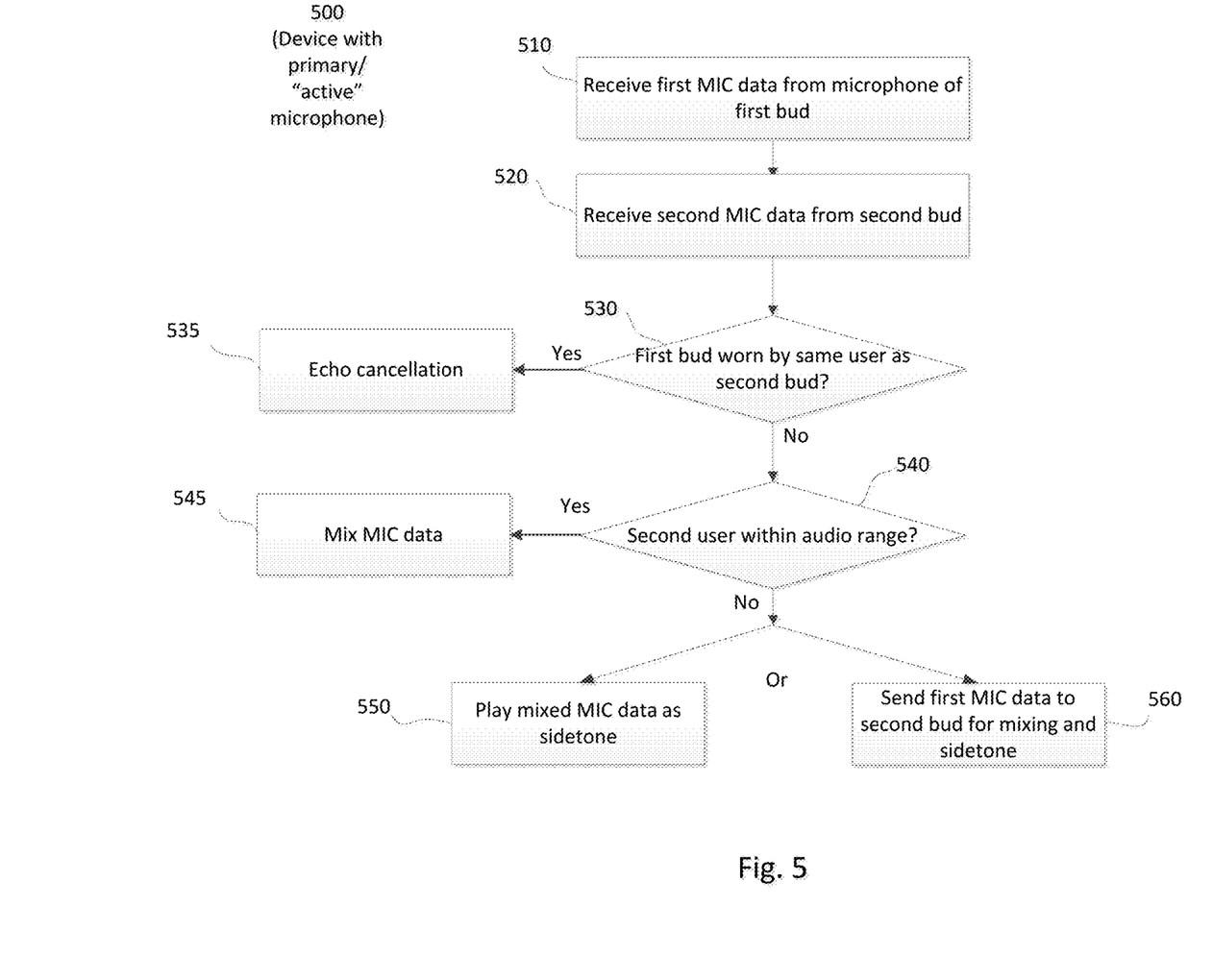
FIG. 5 is a flow diagram illustrating an example method executed by an audio device with a primary microphone according to aspects of the disclosure.

FIG. 5 is a flow diagram illustrating an example method executed by an audio device, such as an earbud, having a first microphone operating in a primary role. In block 510, the device captures first audio data, such as speech input from a user, through the first microphone. In block 520, the device receives secondary microphone data from a second device with a second microphone operating in a secondary mode, for example, over a sideband channel.

In block 530, the first device determines whether it is being worn by a same user as the second device. For example, the first device may compare parameters of the audio data received in blocks 510 and 520, such as decibel, pitch, tone, etc. As another example, the first device may make the determination as a function of power, signal strength, distance between the devices, movements of the devices, etc. If the devices are worn by the same user, the first device performs echo cancellation (block 535), for example, by omitting the audio received in block 520.

If the first device determines that it is being worn by a different user than the second device, it determines whether the second device is within audio range (block 540). For example, it may determine whether it detects a second voice through its microphone, the second voice corresponding to the voice data received in block 520. As another example, it may determine based on a computed distance between the devices.

If the second device is within audio range, the first device mixes the first and second audio from blocks 510 and 520, and plays it back through a speaker of the first device. If the second device is outside of audio range, the first device may perform a corrective action. For example, the first device may play the mixed microphone data as a sidetone (block 550). As another example, the first device may send the first microphone data to the second device for mixing and playback as a sidetone (block 560).

Figure 6:
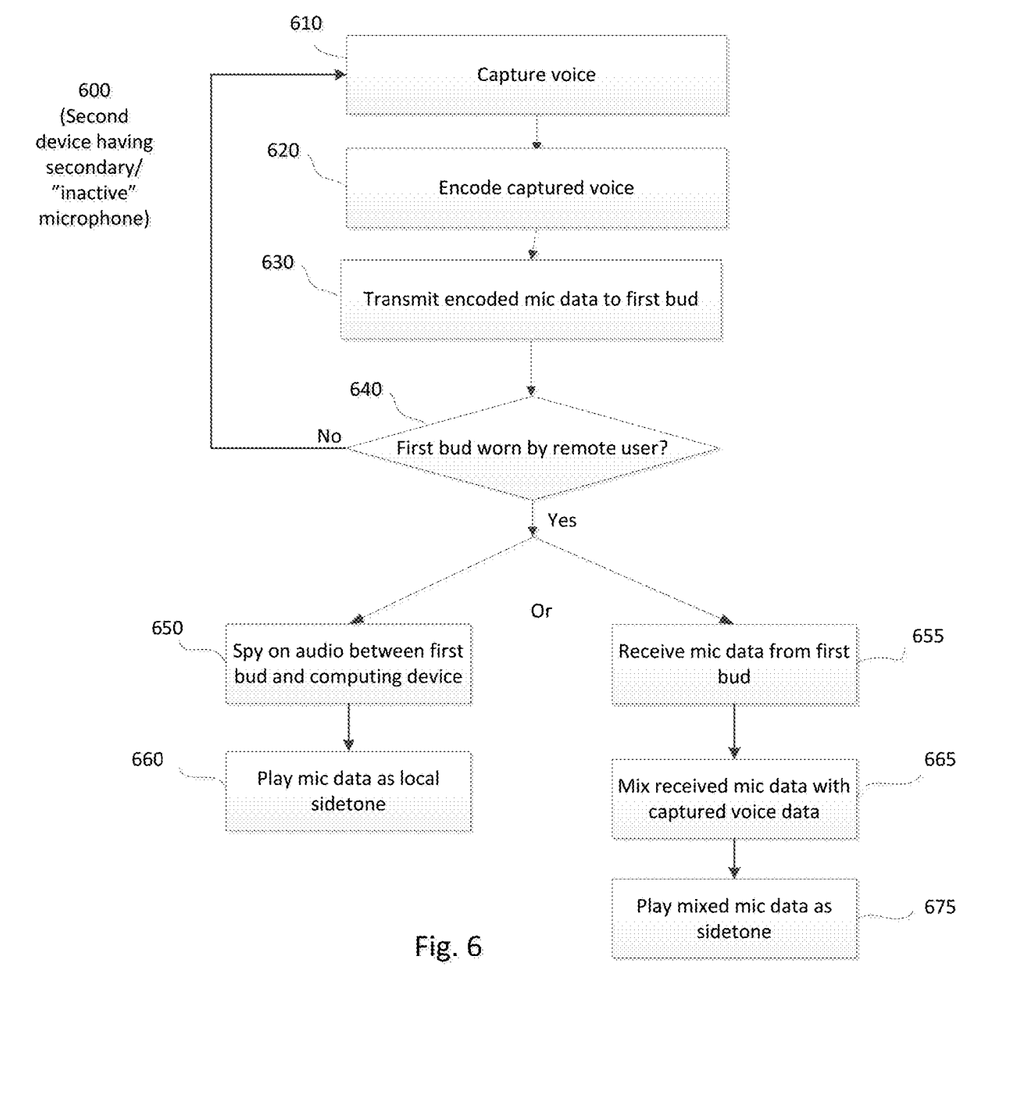
FIG. 6 is a flow diagram illustrating an example method executed by an audio device with a secondary microphone according to aspects of the disclosure.

FIG. 6 is a flow diagram illustrating an example method executed by the second device, an audio device with a secondary microphone. In block 610, the second device captures audio data, such as a user voice, which it encodes (block 620) and transmits to the first device having the primary microphone (block 630). According to some examples, the data may be encoded as L2CAP to minimize delay.

In block 640, the second device may determine whether it is worn by a user that is remote from a user of the first device. For example, it may be determined whether the first device is outside of audio range, such as discussed above in connection with block 540 of FIG. 5. If it is not out of range, it may continue capturing voice in block 610. If it is out of range, however, it may take a corrective action. As one option, the second device may spy on voice data transmitted over an audio connection between the first device and a computing device, such as a mobile phone, in block 650. The second device may playback the data is detected by spying as a local sidetone in block 660. As another option, the second device may receive primary microphone data from the first device in block 655, and in block 665 it may mix the primary microphone data received from the first device with the voice data captured in block 610. In block 675, it may play the mixed data as a sidetone in the second device.

Figure 7:
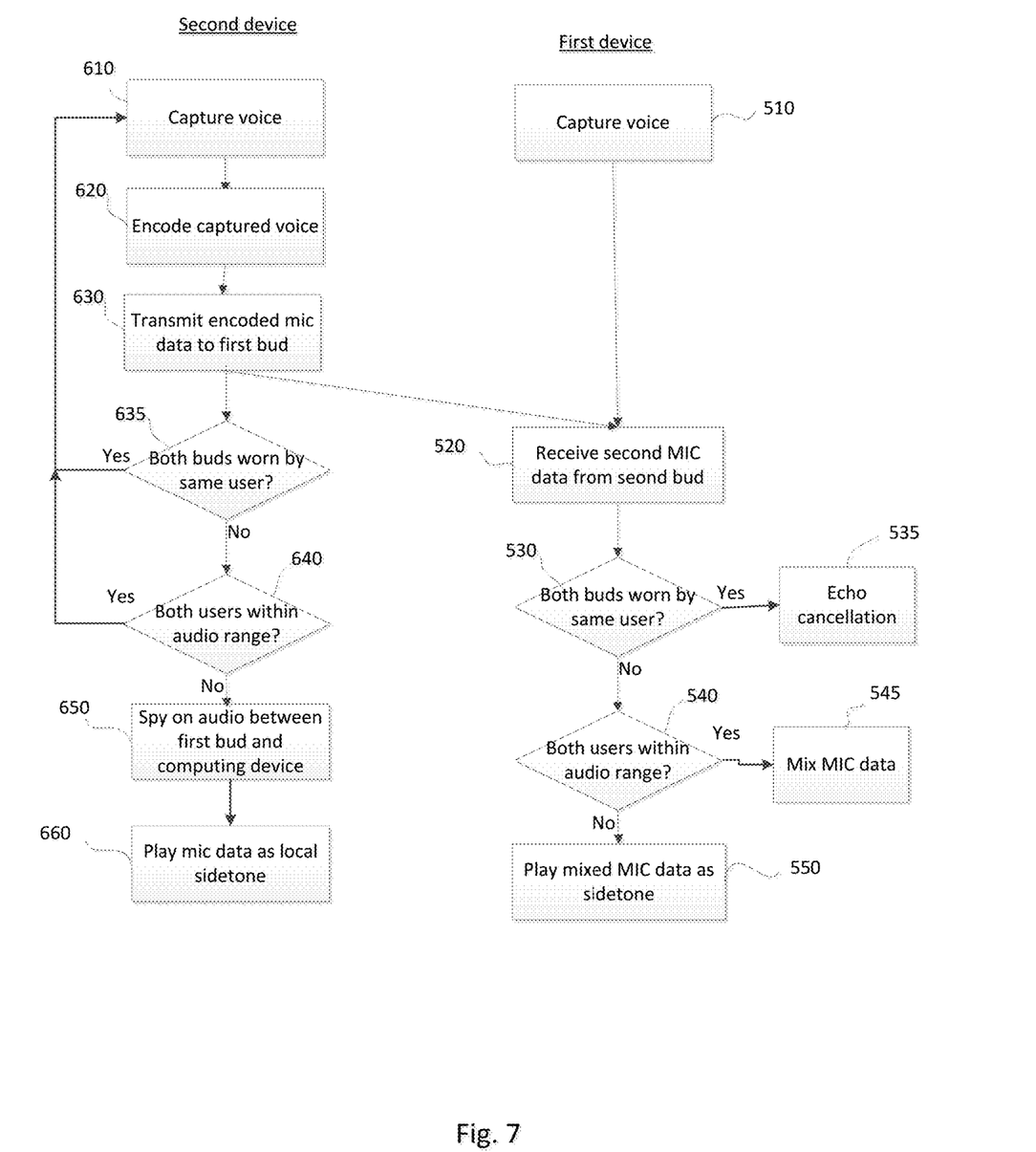
FIG. 7 is a flow diagram illustrating a first example method executed by a system according to aspects of the disclosure.

FIG. 7 is a flow diagram illustrating a first example method executed by a system including the first device and the second device. The first device captures the user voice (block 510). The first device further receives secondary microphone data from the second device, determines whether the first and second devices are worn by the same user and whether within range, and performs echo cancellation or mixes the microphone data as described above in connection with FIG. 5. The second device captures, encodes, and transmits secondary microphone data as described above in connection with FIG. 6. It may also determine whether the first and second devices are worn by the same person in block 635, and whether the devices are out of range from each other (block 640). While FIG. 7 illustrates both devices as determining whether they are out of range, in some examples the determination may be made by one device and communicated to the other.

If the first and second devices are out of range from one another, they may take a corrective action. In this example, the second device spies on the audio connection between the first device and the computing device, and plays back the data as a local sidetone. Meanwhile, the first device plays the mixed microphone data as a sidetone.

Figure 8:
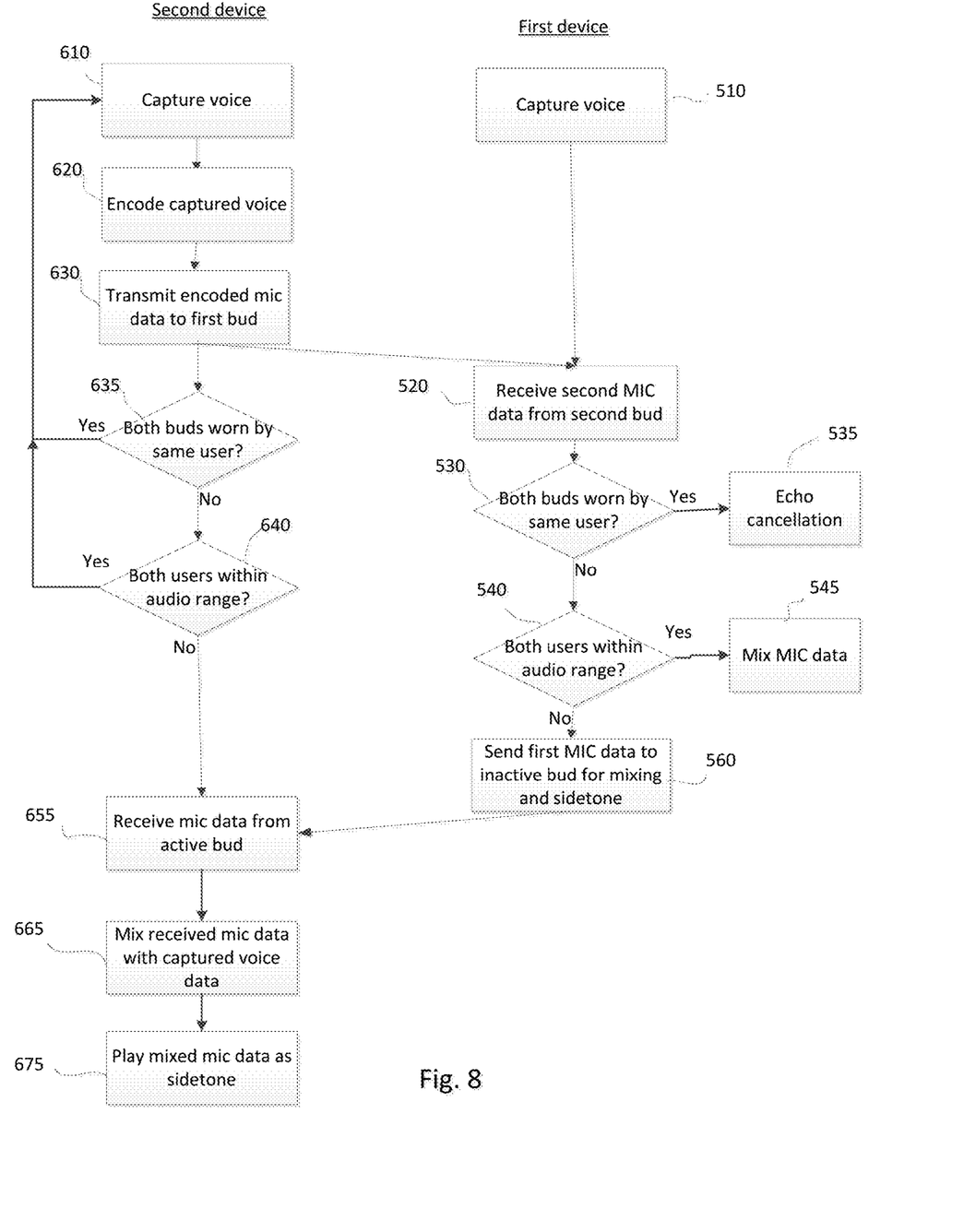
FIG. 8 is a flow diagram illustrating a second example method executed by a system according to aspects of the disclosure.

FIG. 8 is a flow diagram illustrating a second example method executed by the system. Blocks 510-545 and 610-640 may be the same as described above in connection with FIGS. 5-7. However, in this example, a different corrective action may be taken if the first and second devices are out of range of one another. In particular, in block 560 the first device may send the primary microphone data captured through the primary microphone to the second device. In some examples, the first device may encode the data prior to sending, such as using L2CAP. The second device receives the primary microphone data from the first device (block 655), mixes it with secondary microphone data captured through the microphone of the second device (block 665), and plays back the mixed microphone data (block 675).

Figure 9:
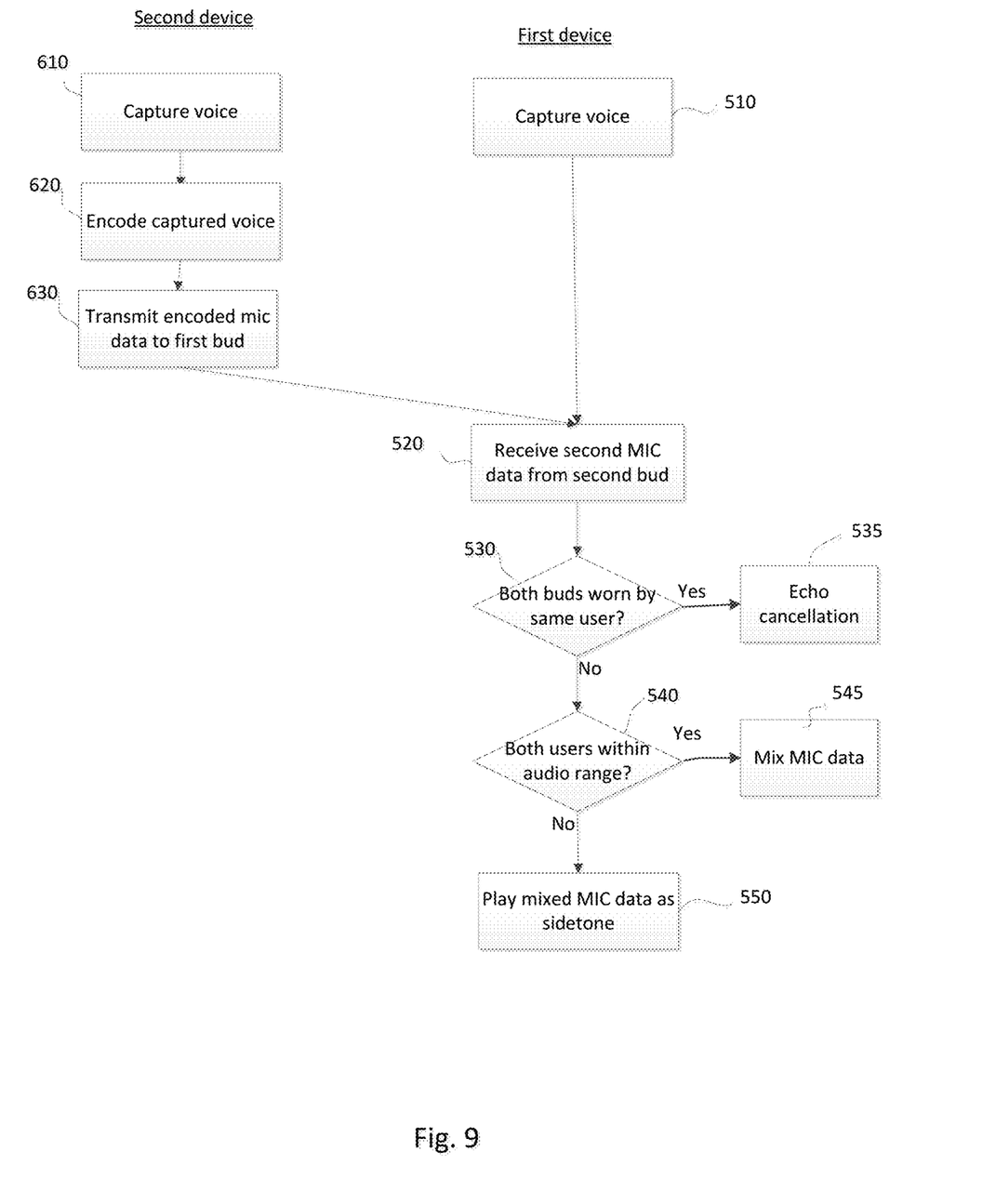
FIG. 9 is a flow diagram illustrating a third example method executed by a system according to aspects of the disclosure.

FIG. 9 is a flow diagram illustrating a third example method executed by the system. According to this example, when it is determined that the two devices are outside of range of each other, the first device having the primary microphone plays the mixed microphone data as a sidetone.

Each of the examples above provide for improved audio quality for a single user, and an improved user experience for multiple users. For example, when multiple users are engaged in a phone call through the same mobile computing device, with each user wearing a separate earbud, the users may nevertheless hear the entire conversation and provide verbal responses without echo or other undesirable audio effects. Because the devices automatically detect whether they are worn by the same user or by different users, and whether the different users are within audio range, the user experience is improved. For example, users will automatically hear audio and their voice input will be received, regardless of how the devices are worn and without requiring the user to first take some action.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for playing back audio, comprising:
 a first device, the first device comprising:
  a first microphone configured to capture first audio information for transmission to a host computing device and configured to transmit information received from the host computing device to a second device over a primary communication channel between the first device and the second device; and
  one or more first processors configured to:
   receive second audio information from the second device over a sideband channel between the first device and the second device, the sideband channel being separate from the primary communication channel; and
   mix the second audio information from the second device with the first audio information from the first device.

2. The system for playing back audio of claim 1, further comprising:
 the second device wirelessly coupled with the first device, the second device comprising:
  a second microphone, the second microphone configured to operate in a secondary role wherein it captures the second audio information for transmission to the first device over the sideband channel.

3. The system of claim 1, wherein the one or more first processors of the first device are further configured to:
 determine whether the first device and the second device are worn by the same person; and
 perform echo cancellation when the first device and the second device are worn by the same person.

4. The system of claim 1, wherein the first device further comprises a first speaker, wherein the one or more first processors of the first device are further configured to determine whether the first device is within audio range of the second device.

5. The system of claim 4, wherein in response to determining that the first device is not within audio range of the second device, the first device plays the mixed first and second audio as a sidetone through the first speaker.

6. The system of claim 4, wherein in response to determining that the first device is not within audio range of the second device, the first device transmits the audio information captured by the first microphone to the second device over the sideband channel.

7. The system of claim 6, wherein the second device mixes the received first audio information from the first device with the second audio information.

8. The system of claim 2, wherein the second device further comprises one or more second processors configured to determine whether the first device is within audio range of the second device.

9. The system of claim 8, wherein the second device is further configured to:
 listen to audio transmitted over a wireless connection between the first device and the computing device when the first device is not within audio range of the second device; and
 play the audio transmitted over the wireless connection between the first device and the computing device as a local sidetone.

10. A method for playing back audio, comprising:
 operating, by a first microphone of a first device, in primary role wherein the first microphone captures audio information for transmission from the first device to a host computing device and transmits information received from the host computing device to a second device over a primary communication channel between the first device and the second device; and
 operating, by a second microphone of the second device, in a secondary role wherein the second microphone captures audio information for transmission from the second device to the first device over a sideband channel, the sideband channel being separate from the primary communication channel; and
 mixing, by one or more first processors of the first device, the audio information from the second device with the audio information from the first device.

11. The method of claim 10, further comprising:
 determining, by the one or more first processors, whether the first device and the second device are worn by the same person; and
 performing echo cancellation when the first device and the second device are worn by the same person.

12. The method of claim 10, further comprising determining, by the one or more first processors, whether the first device is within audio range of the second device.

13. The method of claim 12, further comprising, in response to determining that the first device is not within audio range of the second device, playing the mixed audio information as a sidetone through a first speaker of the first device.

14. The method of claim 12, further comprising, in response to determining that the first device is not within audio range of the second device, transmitting the audio information captured by the first microphone to the second device over a sideband channel.

15. The method of claim 14, further comprising mixing, by the second device, the audio information from the first device with the audio information captured by the second microphone.

16. The method of claim 15, further comprising playing, through a second speaker of the second device, the mixed audio information as a sidetone.

17. The method of claim 10, further comprising determining, by one or more second processors of the second device, whether the first device is within audio range of the second device.

18. The method of claim 17, further comprising:
listening, by the second device, to audio transmitted over a wireless connection between the first device and the computing device when the first device is not within audio range of the second device; and
playing, by the second device, the audio transmitted over the wireless connection between the first device and the computing device as a local sidetone.

19. A method for playing back audio, comprising:
capturing, by a first microphone of a first device, first audio information for transmission from the first device to a host computing device;
transmitting information received at the first device, from the host computing device, to a second device over a primary communication channel between the first device and the second device;
receiving, by the first device, second audio information from a second device over a sideband channel, the sideband channel being separate from the primary communication channel; and
mixing, by one or more first processors of the first device, the audio information from the second device with the audio information from the first device.

20. The system of claim 7, wherein the second device plays, through the second speaker, the mixed audio information as a sidetone.

* * * * *